(12) United States Patent
Harck et al.

(10) Patent No.: US 10,344,884 B2
(45) Date of Patent: Jul. 9, 2019

(54) VALVE WITH A WELDED VALVE HOUSING

(71) Applicant: DANFOSS A/S, Nordborg (DK)

(72) Inventors: Kurt Harck, Sønderborg (DK); Jens Pawlik, Broager (DK); Sigurd Larsen, Hamburg (DE)

(73) Assignee: Danfoss A/S, Nordborg (DK)

( * ) Notice: Subject to any disclaimer, the term of this patent is extended or adjusted under 35 U.S.C. 154(b) by 0 days.

(21) Appl. No.: 15/327,410

(22) PCT Filed: Aug. 19, 2015

(86) PCT No.: PCT/EP2015/069064
§ 371 (c)(1),
(2) Date: Jan. 19, 2017

(87) PCT Pub. No.: WO2016/034418
PCT Pub. Date: Mar. 10, 2016

(65) Prior Publication Data
US 2017/0167624 A1 Jun. 15, 2017

(30) Foreign Application Priority Data

Sep. 1, 2014 (EP) .................................. 14183058
Sep. 9, 2014 (DK) .................................. 201400513
Sep. 17, 2014 (DK) .................................. 201400528

(51) Int. Cl.
F16K 27/10 (2006.01)
F16K 1/12 (2006.01)
F16K 3/26 (2006.01)

(52) U.S. Cl.
CPC .............. *F16K 27/102* (2013.01); *F16K 1/12* (2013.01); *F16K 1/123* (2013.01); *F16K 27/105* (2013.01); *F16K 3/265* (2013.01)

(58) Field of Classification Search
CPC . F16K 27/102; F16K 1/12; F16K 1/04; F16K 1/48; F16K 3/26; F16K 3/262;
(Continued)

(56) References Cited

U.S. PATENT DOCUMENTS 1,197,583 A 9/1916 Sheridan
2,228,849 A 1/1941 Sandos et al.
(Continued)

FOREIGN PATENT DOCUMENTS

CN 2699085 Y 5/2005
CN 1985118 A 6/2007
(Continued)

OTHER PUBLICATIONS

International Search Report for PCT Serial No. PCT/EP2015/069064 dated Nov. 2, 2015.
(Continued)

*Primary Examiner* — Kevin F Murphy
*Assistant Examiner* — Kelsey E Cary
(74) *Attorney, Agent, or Firm* — McCormick, Paulding & Huber LLP

(57) ABSTRACT

A valve (1) comprising a first housing part (2) and a second housing part (3), the first housing part (2) and the second housing part (3) being made from a sheet metal material, and being joined by means of welding, preferably laser welding, to form a closed housing of the valve (1). An actuator (9) is arranged inside the housing for driving movements of a first valve member (7) and/or a second valve member (8), said actuator (9) being arranged directly in a flow of fluid flowing in the fluid flow path during operation of the valve (1). The valve (1) is hermetically sealed due to the welding of the housing parts (2, 3).

20 Claims, 7 Drawing Sheets

(58) Field of Classification Search
CPC ........ F16K 3/265; F16K 31/041; F16K 31/50; F16K 1/123; F16K 31/04
USPC .......................................... 251/266; 137/219
See application file for complete search history.

(56) References Cited

U.S. PATENT DOCUMENTS

| | | | |
|---|---|---|---|
| 2,363,943 A * | 11/1944 | Carlson | F16K 27/102 251/359 |
| 3,485,264 A | 12/1969 | Schulze | |
| 3,654,950 A | 4/1972 | Hamm | |
| 4,041,982 A | 8/1977 | Lindner | |
| 4,327,757 A | 5/1982 | Weevers | |
| 4,402,344 A | 9/1983 | Kemmner | |
| 4,444,220 A | 4/1984 | Seger | |
| 4,471,810 A | 9/1984 | Muchow et al. | |
| 4,635,678 A | 1/1987 | Peterman et al. | |
| 4,742,689 A | 5/1988 | Lowes | |
| 4,972,577 A | 11/1990 | Dierikx | |
| 5,052,656 A | 10/1991 | Katayama | |
| 5,060,910 A | 10/1991 | Iwata et al. | |
| 5,431,188 A | 7/1995 | Cove | |
| 5,950,674 A | 9/1999 | Wylie et al. | |
| 6,029,691 A * | 2/2000 | Tavor | F16K 1/12 137/219 |
| 6,105,614 A | 8/2000 | Bohaychuk et al. | |
| 6,460,567 B1 | 10/2002 | Hansen, III et al. | |
| 6,568,656 B1 | 5/2003 | Wrocklage | |
| 6,802,488 B1 | 10/2004 | Patterson | |
| 7,347,407 B2 | 3/2008 | Chen | |
| 7,353,837 B2 | 4/2008 | Biester | |
| 7,426,938 B2 | 9/2008 | Bohaychuk et al. | |
| 7,699,075 B2 | 4/2010 | Bohaychuk | |
| 8,074,966 B2 | 12/2011 | Biester | |
| 8,136,543 B2 | 3/2012 | Davies, Jr. | |
| 8,297,315 B2 | 10/2012 | Esveldt | |
| 8,312,893 B2 | 11/2012 | Bey et al. | |
| 8,333,363 B2 * | 12/2012 | Nalini | F16K 31/04 251/129.11 |
| 8,485,499 B2 | 7/2013 | Biester | |
| 8,490,652 B2 | 7/2013 | Bohaychuk et al. | |
| 8,561,632 B2 | 10/2013 | Bayer | |
| 8,820,708 B2 | 9/2014 | Bell | |
| 8,944,085 B2 | 2/2015 | Smick | |
| 8,973,600 B2 | 3/2015 | Esveldt | |
| 2003/0146402 A1 | 8/2003 | Hirota et al. | |
| 2003/0196698 A1 | 10/2003 | Lin et al. | |
| 2006/0005890 A1 | 1/2006 | Johnsen et al. | |
| 2009/0223572 A1 | 9/2009 | Roschke et al. | |
| 2010/0187462 A1 | 7/2010 | Davies, Jr. | |
| 2013/0027014 A1 | 1/2013 | Wang et al. | |
| 2013/0320252 A1 | 12/2013 | Hageman et al. | |
| 2014/0197347 A1 | 7/2014 | Smick | |
| 2015/0069279 A1 * | 3/2015 | Larsen | F16K 1/123 251/129.11 |

FOREIGN PATENT DOCUMENTS

| | | |
|---|---|---|
| CN | 101094745 A | 12/2007 |
| CN | 101825186 A | 9/2010 |
| CN | 102292578 A | 12/2011 |
| CN | 203516798 U | 4/2014 |
| CN | 105190132 A | 12/2015 |
| DE | 896140 C | 11/1953 |
| DE | 967453 C | 11/1957 |
| DE | 1114683 | 10/1961 |
| DE | 3515989 A1 | 11/1985 |
| DE | 297 02 036 U1 | 3/1997 |
| DE | 20311032 U1 | 11/2004 |
| DE | 102010048901 | 4/2012 |
| EP | 0 232 858 A1 | 8/1987 |
| EP | 0257906 A1 | 3/1988 |
| EP | 0635688 A1 | 1/1995 |
| EP | 0 857 902 A2 | 8/1998 |
| EP | 1087158 A1 | 3/2001 |
| EP | 1255066 A2 | 11/2002 |
| EP | 1316750 A1 | 6/2003 |
| EP | 1384637 A2 | 1/2004 |
| EP | 1403574 A1 | 3/2004 |
| EP | 1715231 A1 | 10/2006 |
| EP | 1736693 A1 | 12/2006 |
| EP | 2157345 A1 | 2/2010 |
| EP | 2157349 A1 | 2/2010 |
| EP | 2226697 A1 | 9/2010 |
| EP | 2 653 758 A1 | 10/2013 |
| FR | 1280679 A | 1/1962 |
| FR | 2871212 A1 | 12/2005 |
| GB | 317635 A | 8/1929 |
| JP | H08-197269 A | 8/1996 |
| JP | 2009030696 A | 2/2009 |
| TW | M253458 U | 12/2004 |
| WO | 9322590 A1 | 11/1993 |
| WO | 9325832 A1 | 12/1993 |
| WO | 96/03721 A1 | 2/1996 |
| WO | 9811431 A1 | 3/1998 |
| WO | 0020145 A1 | 4/2000 |
| WO | 2007048942 A2 | 5/2007 |
| WO | 2008025321 A1 | 3/2008 |
| WO | 2009021492 A1 | 2/2009 |
| WO | 2010087936 A1 | 8/2010 |
| WO | 2011018087 A1 | 2/2011 |
| WO | 2012045310 A1 | 4/2012 |
| WO | 2012045764 A1 | 4/2012 |
| WO | 2014/072715 A1 | 5/2014 |

OTHER PUBLICATIONS

International Search Report for Serial No. PCT/DK2013/000073 dated Aug. 1, 2014.

European Examination Report for Serial No. 15 750 785.6 dated Aug. 10, 2018.

* cited by examiner

VALVE WITH A WELDED VALVE HOUSING

CROSS-REFERENCE TO RELATED APPLICATIONS

This application is a National Stage application of International Patent Application No. PCT/EP2015/069064, filed on Aug. 19, 2015, which claims priority to European Patent Application No. 14183058.8, filed on Sep. 1, 2014, Danish Patent Application No. PA201400513, filed on Sep. 9, 2014, and Danish Patent Application No. PA201400528, filed on Sep. 17, 2014, each of which is hereby incorporated by reference in its entirety.

TECHNICAL FIELD

The present invention relates to a valve comprising a first housing part and a second housing part, which are joined together to form a closed valve housing. The valve of the invention is hermetically sealed, and is easy and cost effective to manufacture.

BACKGROUND

Valve housings are often made from parts which are machined, e.g. from brass material. Other parts of the valve, such as connectors and actuator casings, may be made from a material which is different from the material of the valve housing. Accordingly, various parts of the valve are assembled either by means of soldering or by means of mechanical connections, such as screw connections including a sealing member, such as a gasket and/or an o-ring.

In the case that a soldering technique is used, heating of the entire valve is required, and this has the consequence, that only materials which are able to withstand the required temperatures can be used for any parts of the valve. For instance, this rules out the use of plastic parts.

In the case that mechanical connections are used, there is a risk of leaks occurring in the valve. This is particularly an issue if the valve is operated at high pressure levels.

U.S. Pat. No. 8,136,543 B2 discloses an axial flow control valve including a valve body defining a passageway between an inlet and an outlet that is substantially parallel to a fluid flow path at the inlet and the outlet of the valve body. The control valve includes a cartridge assembly removably coupled to the valve body and disposed within the passageway of the valve body between the inlet and the outlet. The cartridge assembly is substantially axially aligned with the passageway and includes a motor to operate the axial flow control valve between a first position to prevent the flow of fluid between the inlet and the outlet and a second position to allow the flow of fluid between the inlet and the outlet.

EP 0 232 858 A1 discloses a retention valve for liquid-bearing conduits, comprising a containment body provided with threaded sleeves for connecting to conduits, and, in its interior, with valve means suitable for cutting off the flow of a liquid. The containment body is provided in two parts of pressed sheet metal, which may be connected by a tungsten inert gas (TIG) or the like circumferential welding. The retention valve is a passive or pressure controlled valve. Accordingly, no actuator is present for controlling the valve.

US 2014/0197347 A1 discloses a valve arranged inside a body cavity portion. A tapered inlet portion is welded onto the body cavity portion. An actuator is arranged exteriorly with respect to the body cavity portion.

WO 2014/072715 A1 discloses a motorized sleeve valve including a valve body defining a first fluid port and a second fluid port and a valve sleeve surrounding at least a portion of the valve body. An electric motor configured to actuate the valve sleeve is arranged inside a tubular shroud surrounding the sleeve valve.

EP 2 653 758 A1 discloses an axial valve comprising an actuator. The movable valve parts and the actuator are arranged inside a valve housing formed in one piece.

SUMMARY

It is an object of embodiments of the invention to provide a valve which is hermetically sealed, even at high pressure levels.

It is a further object of embodiments of the invention to provide a valve which is easy and cost effective to manufacture.

The invention provides a valve comprising:
- a first housing part and a second housing part, the first housing part and the second housing part forming a closed housing of the valve,
- an inlet connector arranged to receive fluid from a fluid flow line to an interior part of the closed housing, and an outlet connector arranged to deliver fluid to the fluid flow line from the interior part of the closed housing, a fluid flow path through the valve thereby being defined, the fluid flow path providing a fluid connection from the inlet connector to the outlet connector,
- a first valve member and a second valve member arranged inside the housing, the first valve member and the second valve member being movable relative to each other, and the first valve member and the second valve member defining a fluid passage arranged in the fluid flow path, a size of the fluid passage being determined by a relative position of the first valve member and the second valve member,
- an actuator arranged inside the housing for driving movements of the first valve member and/or the second valve member, said actuator being arranged directly in a flow of fluid flowing in the fluid flow path during operation of the valve, wherein the first housing part and the second housing part are made from a sheet metal material, and wherein the first housing part and the second housing part have been joined to form the closed housing by means of welding.

The valve according to the invention comprises a first housing part and as second housing part which together form a closed housing of the valve. Thus, when the first housing part and the second housing part are attached to each other, a closed cavity is defined with the first housing part and the second housing part forming the walls surrounding the closed cavity, the closed cavity forming an interior part of the closed housing.

The valve further comprises an inlet connector and an outlet connector. The inlet connector is arranged to receive fluid from a fluid flow line, into which the valve is connected, and to convey the fluid to the interior part of the closed housing. Similarly, the outlet connector is arranged to deliver fluid from the interior of the closed housing to the fluid flow line.

Thus, a fluid flow path is defined through the valve, from the inlet connector to the outlet connector, through the interior part of the closed housing. During operation of the valve, fluid flows in the fluid flow path.

In the present context the term 'fluid' should be interpreted to cover a liquid, a gas or a mixture of liquid or gas.

The valve further comprises a first valve member and a second valve member arranged in the interior part of the closed housing. The first valve member and the second valve member are movable relative to each other. This could, e.g., be obtained by the first valve member being movable relative to the closed housing, while the second valve member remains fixed relative to the closed housing. As an alternative, the second valve member may be movable relative to the closed housing, while the first valve member remains fixed relative to the first housing. As another alternative, the first valve member as well as the second valve member may be movable relative to the closed housing, in such a manner that the relative position of the first valve member and the second valve member changes. In any event, the relative position of the first valve member and the second valve member can be changed or adjusted, due to the relative movements.

The first valve member and the second valve member define a fluid passage arranged in the fluid flow path. Thus, fluid flowing through the valve, via the fluid flow path from the inlet connector to the outlet connector, passes through the fluid passage.

A size of the fluid passage is determined by a relative position of the first valve member and the second valve member. Thus, when the first and/or the second valve member is/are moved, and the relative position of the first valve member and the second valve member is thereby changed or adjusted, the size of the fluid passage is also adjusted. Thereby the fluid flow through the fluid flow path is also adjusted. A specific relative position of the first valve member and the second valve member may advantageously define a closed position of the valve, where fluid is prevented from passing the fluid passage, and thereby from passing through the valve.

The valve further comprises an actuator arranged inside the housing for driving movements of the first valve member and/or the second valve member. The actuator is arranged directly in a flow of fluid flowing in the fluid flow path during operation of the valve. Thereby the fluid flowing through the valve during operation flows directly past the actuator. The actuator may thereby be cooled by means of the fluid flowing through the valve, and the fluid flowing through the valve is used for transporting the heat away from the actuator. Thereby it is prevented that the actuator, in particular a motor of the actuator, overheats, i.e. damage to the actuator is prevented. This is in particular relevant during abnormal situations, such as during tests, where the motor is more active than during normal operation of the valve. Furthermore, arranging the actuator directly in the fluid flow allows an axial or in-line design of the valve, where the direction of the fluid flow through the valve is substantially linear through the entire valve from the inlet connector to the outlet connector. The actuator does not protrude from the valve housing, and it is not arranged in a separate housing part. This provides a compact design of the valve, and the risk of leaks occurring is reduced, because fewer parts need to be joined to each other.

The first housing part and the second housing part are made from a sheet metal material. This is an inexpensive material, and the manufacturing costs of the valve are therefore reduced as compared to a valve where the valve housing is made from machined brass. Furthermore, the valve can be made with a reduced wall thickness, and thereby the weight of the valve can be reduced.

The first housing part and the second housing part have been joined to form the closed housing by means of welding. This is possible because the first housing part and the second housing part are made from a sheet metal material. Thus, the first housing part and the second housing part are joined in an irreversible and permanent manner, in the sense that once the first housing part and the second housing part have been joined to each other, it is not possible to separate them again, thereby gaining access to the interior part of the closed housing, without breaking the valve housing.

The welding provides a hermetic seal between the first housing part and the second housing part. Thereby the risk of leaks occurring in the valve is reduced, as compared to a valve where the housing parts have been joined in a reversible manner, such as by means of a mechanical connection. Furthermore, when using a welding technique, heating only occurs locally, so only the areas where welding is performed, and areas immediately adjacent thereto, are heated to high temperatures. Thereby it is possible to use materials, which are not capable of withstanding high temperatures, for parts of the valve which are not in immediate contact with the welding zones.

The first housing part and the second housing part may have been joined to form the closed housing by means of laser welding. During laser welding, heating only occurs very locally within the welding zone. This makes it possible to use materials, which are not capable of withstanding high temperatures, even close to the welding zone. Accordingly, this is a very suitable welding technique for the valve according to the invention.

The first housing part and the second housing part may be arranged with an overlap, and the valve may comprise a first welding seam arranged at an edge of the first housing part or the second housing part, and a second welding seam arranged in a region defined by the overlap of the first housing part and the second housing part.

The first welding seam may preferably be arranged at the edge of the housing part which defines an outer surface of the valve housing in the region where the first housing part and the second housing part overlap. Thereby the first welding seam provides sealing between the first valve housing and the second valve housing, in the overlap region, with respect to the exterior of the valve housing. Thus, the first welding seam prevents that a gap is formed between the first valve housing and the second valve housing, into which substances from outside may enter. If such a gap exists and substances are allowed to enter the gap, there is a risk of gap corrosion of the valve. This is highly undesirable, and it is therefore an advantage that the valve comprises a first welding seam arranged as described above.

Due to manufacturing inaccuracies of the housing parts, and of the welding process, a first welding seam as described above may not provide sufficient strength to the welding. It is therefore an advantage that the valve further comprises a second welding seam arranged in a region defined by the overlap of the first housing part and the second housing part, because the second welding seam is capable of providing the required strength to the welding joint. Thus, according to this embodiment, the first welding seam provides sealing for the joint, thereby preventing gap corrosion, and the second welding seam ensures that the welding joint is sufficiently strong to withstand any expected impact during operation of the valve.

At least the first welding seam may be formed while directing welding equipment towards the edge of the first or second housing part at an angle with respect to an exterior surface of the valve housing. Thereby it is ensured that the gap between the first valve housing and the second valve housing is properly sealed, even if there are inaccuracies in the edge of the first or second valve housing.

The first welding seam may be a full welding seam, extending entirely along a circumference defined by the closed housing, and the second welding seam may be a partial welding seam, extending only partly along the circumference defined by the closed housing. Since the first welding seam extends entirely along the circumference defined by the closed housing, it is ensured that the gap between the first housing part and the second housing part is completely sealed, and gap corrosion is efficiently prevented. By providing the second welding seam as a partial welding seam, it is obtained that the amount of heat transferred to the valve due to the welding process is reduced, as compared to a situation where the second welding is also a full welding seam. However, arranging the welding portions of the second welding seam in an appropriate manner, it is still possible to provide sufficient strength to the welding joint. This is in particular an advantage in the case that all welding seams of the valve are provided in one welding step. In this case it is desired to reduce the amount of heat transferred to the valve during this welding step.

For instance, the second welding seam may comprise eight welding portions, each covering 15° of the circumference of the valve housing, the eight welding portions being distributed evenly or equidistantly along the circumference of the valve housing. Thereby the welding portions cover a total of 120° of the 360° circumference of the valve housing.

The first housing part and/or the second housing part may be made from deep drawn sheet metal material. Deep drawing is a sheet metal forming process, in which a sheet metal blank is radially drawn into forming a die by the mechanical action of a punch. The process is considered 'deep' drawing when the depth of the drawn part exceeds its diameter. This may be achieved by redrawing the part through a series of dies. It is possible to manufacture even very complex shapes by means of deep drawing. Any desired shape of the housing parts may thereby be obtained in an easy and cost effective manner.

Other parts of the valve may also be made from deep drawn sheet metal material. Examples of such parts include, but are not limited to, the inlet connector, the outlet connector, the first valve member, the second valve member, encapsulations arranged inside the closed housing, frame parts arranged inside the closed housing, etc.

The first valve member, the second valve member and the actuator may be assembled to form a valve cartridge, and the valve cartridge may be attached to the first housing part or the second housing part by means of welding. According to this embodiment all, or almost all, of the parts which are arranged inside the closed housing, are preassembled before they are arranged inside the closed housing. In particular, all of the parts which provide the valve operations of the valve, i.e. the first valve member, the second valve member and the actuator, are preassembled in this manner. This allows the assembly containing these parts to be tested prior to or during assembling of the valve, e.g. with respect to internal leaks and operation of the valve. This reduces the risk of failure of the assembled valve.

By welding the valve cartridge to the first housing part or the second housing part, it can be ensured that the valve cartridge is properly positioned inside the closed housing, e.g. with respect to aligning the parts of the valve with respect to each other. For instance, the valve cartridge may be welded onto a housing part by welding one of the valve members to the housing part.

The valve cartridge may be supported by the second housing part or the first housing part via one or more biased support legs. According to this embodiment, the valve cartridge may be supported by, but not attached to, the housing part which the valve cartridge is not welded onto. For instance, one end of the valve cartridge may be welded onto one of the housing parts, and an opposite end of the valve cartridge may be supported by the other one of the housing parts via the one or more biased support legs. Thereby any misalignments, stress or tension which may occur between the valve housing and the valve cartridge can be absorbed or counteracted by the biased support legs. Thereby alignment of the components of the valve cartridge and the valve housing can be ensured. Furthermore, the valve can be assembled in an easy and reliable manner by welding the cartridge onto one of the housing parts, and then simply slipping to other housing over the cartridge.

The inlet connector and/or the outlet connector may be attached to the first housing part or the second housing part by means of welding. According to this embodiment, the inlet connector and/or the outlet connector is/are manufactured as a separate part, e.g. by means of deep drawing, and subsequently attached to a relevant housing part by means of welding. As described above, using a welding technique reduces the risk of leaks occurring in the valve.

By manufacturing the inlet connector and/or the outlet connector as a separate part has the advantage that the valve housing can be manufactured as a standard housing, and connectors of an appropriate size can be attached to the valve housing, in order to meet the specific requirements with respect to flow through the valve. For instance, in the case that the valve is to be used as a pure gas valve, an inlet connector and an outlet connector of the same size may advantageously be selected. On the other hand, in the case the valve is to be used as an expansion valve, an inlet connector having a smaller cross sectional area than the cross sectional area of the outlet connector may advantageously be selected. Furthermore the size of the inlet connector as well as the size of the outlet connector may be selected in accordance with the expected flow rate through the valve and/or in accordance with the size of piping in the fluid flow line which the valve is connected to.

The inlet connector and/or the outlet connector may be arranged with an overlap with respect to the first housing part or the second housing part, and at least one welding of a connector and a housing part may comprise at least two welding seams. Similarly to the description above with respect to the welding of the first housing part and the second housing part, one of the welding seams may be a sealing welding seam which is arranged at an edge of the connector or the housing part, in such a manner that gap corrosion is prevented. The other welding seam may provide the required strength to the welding joint, and may accordingly be arranged at the overlap region. Furthermore, one of the welding seams may be a full welding seam while the other may be a partial welding seam.

The first valve member may comprise one or more orifices and the second valve member may comprise one or more closing elements being arranged to cover a part of the one or more orifices, and the relative position of the first valve member and the second valve member may determine a portion of the one or more orifices being covered by the one or more closing elements of the second valve member.

According to this embodiment, the fluid passage of the first and second valve members is defined by the orifices and the closing elements. When the first valve member and the second valve member move relative to each other, the orifices and the closing elements are also moved relative to each other. Accordingly, the portion of the orifices being covered by the closing elements is thereby changed, thereby changing the size of the fluid passage. When the orifices are completely covered by the closing elements, fluid is prevented from passing through the orifices, and the valve is thereby closed.

The first valve member and/or the second valve member may be a cup shaped member. In the present context the term 'cup shaped' should be interpreted to mean a substantially cylindrical shape which is closed at one end.

The one or more orifices may have a substantially rectangular shape. This provides a substantially linear opening characteristic of the valve, because a linear, sliding movement of the covering members along the rectangular orifices will result in a linear change in the uncovered area of the orifices.

As an alternative, any other suitable shape of the orifices may be selected, in order to provide a desired opening characteristic of the valve. Thus, the orifices may, e.g., be circular, triangular, quadratic, oval, drop-shaped, etc.

The first valve member and/or the second valve member may be adapted to perform sliding movements. According to this embodiment, the relative movement of the first valve member and the second valve member is of a sliding kind.

The valve may further comprise a first sealing member arranged to provide sealing between the first valve member and the second valve member at an outlet side of the fluid passage, and a second sealing member arranged to provide sealing between the first valve member and the second valve member at an inlet side of the fluid passage.

The first sealing member and the second sealing member prevent internal leaks of the valve during operation, in particular when the valve is in a closed position.

The first sealing member may be arranged to provide sealing between the first valve member and the second valve member only when the valve is in a closed position.

The second valve member may be linearly movable with respect to the first valve member, and forces acting on the second valve member, due to a pressure prevailing at a high pressure region in the valve, along a first direction of movement and along a second, opposite, direction of movement of the second valve member may be substantially equal.

During operation of an expansion valve, a pressure drop in the fluid passing through the valve occurs across the mechanism which controls the valve operation and provides the expansion of the fluid. In the valve according to the invention, this mechanism is formed by the fluid passage defined by the first valve member and the second valve member. When the valve is in a closed position, i.e. no fluid is allowed to pass through the valve, a differential pressure may build up across the closed fluid passage. This has the consequence that when it is desired to open the valve, a force originating from the high pressure acting on various parts of a valve member being moved, must be overcome by the actuator driving the movements of the first valve member and/or the second valve member.

By designing the second valve member in such a manner that the forces acting on the second valve member, due to a pressure prevailing at a high pressure region in the valve, along a first direction of movement and along a second, opposite, direction of movement of the second valve member are substantially equal, these forces balance each other, and therefore there will be no additional force to overcome by the actuator. This provides a perfectly balanced valve, regardless of the prevailing pressure in the valve.

The second valve member may define an end part, and the end part of the second valve member may be tapered in a direction towards the first valve member. This is one way of obtaining that the forces acting on the second valve member, due to the high pressure in the valve, are balanced, and this will be explained in further detail below.

The actuator may comprise a spindle connected to the first valve member or the second valve member, and movements of the spindle may cause movements of the first valve member or the second valve member. According to this embodiment, rotational movements of the actuator may be transferred into linear movements of the first valve member or the second valve member, via the spindle, and possible a threaded nut arranged at the relevant valve member. An anti-rotation mechanism may be provided which prevents the first valve member or the second valve member from performing rotational movements when the rotating movements of the spindle are transferred to the first valve member and the second valve member. Such an anti-rotation mechanism may, e.g., include a groove formed in a wall part of the relevant valve member, the groove extending along the direction of the linear movements, and an engaging member formed on a stationary part, e.g. a frame part, the engaging member being arranged in engagement with the groove.

The valve may further comprise an encapsulation of at least a part of the actuator, said encapsulation providing shielding of at least a part of the actuator against a direct fluid flow of fluid flowing through the fluid flow path during operation of the valve. The fluid flowing through the valve may carry various impurities, e.g. in the form of particles and/or larger fragments. Such impurities may cause damage to the actuator, and/or may be the cause of short circuiting of the actuator in the case that they are allowed to reach the actuator. Accordingly, protecting the actuator against a direct fluid flow prevents that impurities carried by the fluid reaches the actuator, and thereby the actuator is protected against damage. The encapsulation may, e.g., be in the form of a shield arranged upstream relative to the actuator, the shield being adapted to guide the fluid past the actuator.

The actuator may comprise a stepper motor. As an alternative, other suitable kinds of motors may be used.

The valve according to the invention may, e.g., be assembled in the following manner. Initially, the first valve member and the second valve member are arranged adjacent to each other. In the case that the first valve member and the second valve member are cup shaped, one valve member may be arranged inside the other. Next, the valve members may be mounted on a frame part, which is in turn mounted on an actuator. Thereby the first valve member, the second valve member, the frame and the actuator form a valve cartridge, comprising all operational parts of the valve. The valve cartridge may then be tested, e.g. with respect to operation and/or with respect to leaks.

The valve cartridge may then be positioned inside the first housing part, and the first valve part may be welded onto the first housing part. This ensures that the components of the valve cartridge are properly mounted and aligned inside the first housing part, and with respect to the fluid flow path through the valve.

Then the second housing part is joined to the first housing part by means of welding, in such a manner that the second valve part also covers the components of the valve cartridge. Thereby a closed valve housing is formed with the components of the valve cartridge arranged in an interior part of the closed valve housing.

Then an inlet connector and an outlet connector are attached to the closed valve housing by means of welding. Furthermore, a sight glass and/or an electrical connector may be attached to the closed valve housing, preferably by means of welding.

The valve may comprise at least one element which is unable to withstand temperatures above 120° C. The at least one element may be unable to withstand high temperatures in the sense that the element is damaged if it is subjected to high temperatures, e.g. due to various properties of the material from which the element is made. Alternatively or additionally, the element may become inoperable, or may be caused to operate in an unreliable manner if it is subjected to high temperatures.

An example of such an element may, e.g., be an element made from a plastic material and/or a gasket arranged to provide sealing, either between the interior part of the closed valve housing and the exterior of the valve, or between parts arranged inside the valve housing. In this case the material of the element will be damaged if the element is subjected to high temperatures, such as temperatures above 120° C.

Another example of an element which is unable to withstand temperatures above 120° is a motor of the actuator. The motor may comprise a permanent magnet, and if the permanent magnet is subjected to high temperatures, such as temperatures above 120° C., it may become permanently demagnetized, and thereby the motor becomes inoperable.

It is an advantage that the housing parts of the valve of the invention are joined to form the closed housing by means of welding, because thereby the housing parts are only locally heated in the region where the welding takes place, and the remaining parts of the valve are not subjected to high temperatures. Thereby it is ensured that the element(s) which is/are unable to withstand high temperatures is/are not damaged during assembly of the valve. If, for instance, the housing parts were assembled by means of a soldering technique, it would be necessary to heat the entire valve in a soldering oven, and thereby all parts of the valve would be subjected to high temperatures. Accordingly, it would not be possible to include elements in the valve which are unable to withstand high temperatures.

At least one of the elements may be arranged in the interior part of the closed housing. One example of such an element is a motor of the actuator, as described above. Another example is a gasket or sealing member arranged to provide sealing between parts of the valve in order to avoid internal leaks of the valve. Yet another example is a sensor arranged inside the valve housing. Since the housing parts are joined by means of welding, and the heating caused by the welding is local, the heat sensitive elements can safely be arranged inside the valve housing, without risking damage to the elements during the assembly process. For instance, this allows the actuator to be arranged inside the valve housing, and directly in the fluid flow, while providing a hermetically sealed valve housing.

BRIEF DESCRIPTION OF THE DRAWINGS

The invention will now be described in further detail with reference to the accompanying drawings, in which.

DETAILED DESCRIPTION

Figure 1:
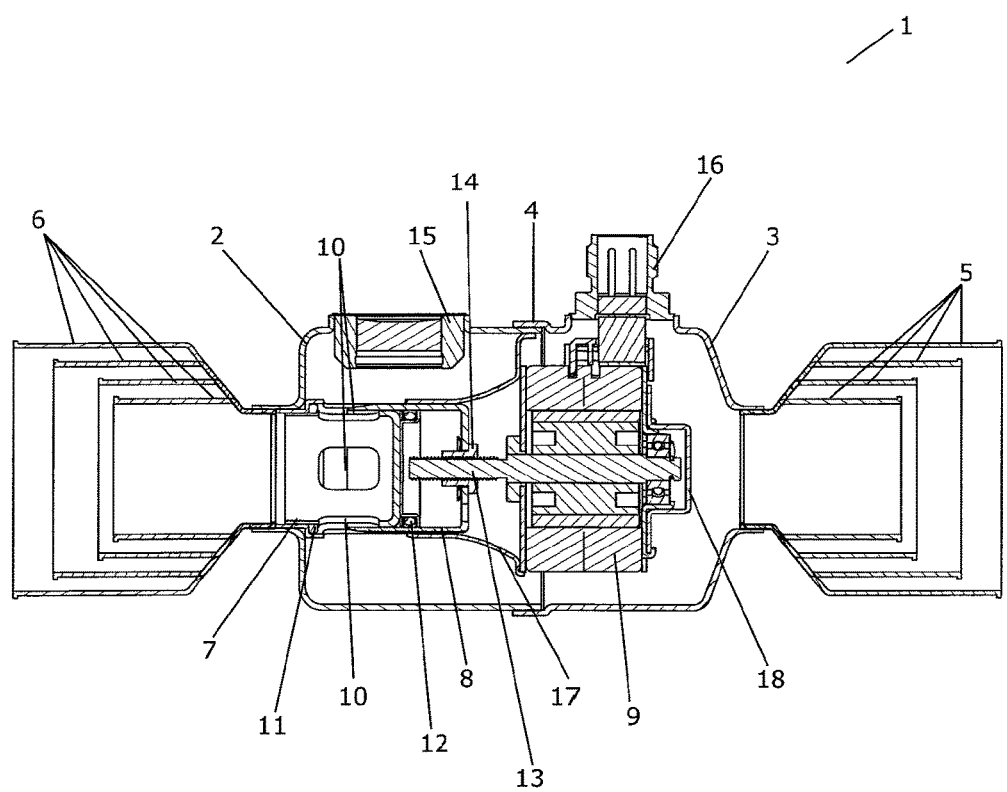
FIG. 1 is a cross sectional view of a valve according to a first embodiment of the invention.

FIG. 1 is a cross sectional view of a valve 1 according to a first embodiment of the invention. The valve 1 comprises a first housing part 2 and a second housing part 3 which have been joined to form a closed valve housing by means of laser welding along a connecting zone 4. Thereby it is ensured that the valve housing is hermetically sealed. The first housing part 2 and the second housing part 3 are made from deep drawn sheet metal.

An inlet connector 5 and an outlet connector 6 are attached to the valve housing, also by means of laser welding. In FIG. 1 several inlet connectors 5 and several outlet connectors 6 are shown, in order to illustrate that an inlet connector 5 and an outlet connector 6 of an appropriate size can be selected and welded onto the valve housing. The inlet connector 5 and the outlet connector 6 are arranged to be connected to a fluid flow line in such a manner that the inlet connector 5 receives fluid from the fluid flow line and the outlet connector 6 delivers fluid to the fluid flow line. A fluid flow path through the valve 1 is thereby defined, from the inlet connector 5 to the outlet connector 6, via the interior part of the closed valve housing.

It should be noted that the valve 1 may be a bi-flow valve, i.e. a valve 1 where flow in both directions through the valve 1 is possible. When reversing the flow direction through the valve 1, the inlet connector 5 will act as an outlet connector, and the outlet connector 6 will act as an inlet connector.

A first valve member 7, a second valve member 8 and an actuator 9 are arranged in the interior part of the closed valve housing. The first valve member 7 and the second valve member 8 are both in the form of a cup shaped member, and the second valve member 8 is arranged to slide along an outer part of a side wall of the first valve member 7. Thereby the first valve member 7 and the second valve member 8 perform relative movements. The first valve member 7, the second valve member 8 and the actuator 9 are arranged directly in the fluid flow path through the valve 1 from the inlet connector 5 to the outlet connector 6, and the actuator 9 thereby comes directly into contact with fluid flowing through the valve 1. The first valve member 7 is attached to the first housing part 2 by means of laser welding.

The first valve member 7 is provided with a number of rectangular orifices 10 formed in the side wall. When the second valve member 8 slides along the first valve member 7, the second valve member 8 covers a varying portion of the orifices 10. Thereby the side wall of the second valve member 8 forms a closing element, and the orifices 10 and the second valve member 8 in combination define a fluid passage, the size of the fluid passage being determined by the relative position of the first valve member 7 and the second valve member 8.

A first sealing member 11 and a second sealing member 12 are arranged to provide sealing between the first valve member 7 and the second valve member 8. Thereby internal leaks in the valve 1 are prevented. The sealing members 11, 12 will be described in further detail below with reference to FIGS. 3-5.

The actuator 9 comprises a spindle 13 which is arranged in engagement with a threaded nut 14 attached to the second valve member 8. Thus, when the actuator 9 rotates the spindle 13, the second valve member 8 is caused to perform a linear movement. Accordingly, the actuator 9 provides the relative movements of the first valve member 7 and the second valve member 8, via the spindle 13 and the nut 14.

A sight glass 15 is attached to the closed valve housing by means of laser welding. Accordingly, the hermetic properties of the closed valve housing are not compromised by the sight glass 15. The sight glass 15 is arranged at a position which allows the first valve member 7 and the second valve member 8 to be inspected. Thereby it can easily be determined whether or not the valve 1 is operating properly.

An electrical connector 16 is also attached to the closed valve housing by means of laser welding. Accordingly, the hermetic properties of the closed valve housing are not compromised by the electrical connector 16. The electrical connector 16 is arranged at a position corresponding to the position of the actuator 9. Thereby power can be supplied to the actuator 9 via the electrical connector 16.

The second valve member 8 is mounted slidingly on a frame 17, which is also attached to the actuator 9. The frame 17 is further supported by the valve housing. Furthermore, the first valve member 7 is attached to the frame 17. Thereby alignment of the first valve member 7 and the second valve member 8 in the fluid flow path is ensured. Furthermore, the frame 17 shields the actuator 9 against the direct flow of fluid passing through the valve 1.

The first valve member 7, the second valve member 8, the frame 17 and the actuator 9, when assembled as described above, form a valve cartridge including all of the operational parts of the valve 1. The valve cartridge may be preassembled and tested before being mounted inside the valve housing. This minimises the risk of the valve 1 being faulty or in-operational.

The valve 1 may, e.g., be operated in the following manner. Fluid is received at the inlet connector 5 and enters the interior part of the closed valve housing. The fluid flows past the actuator 9, thereby providing cooling for the actuator 9 in the case that this is required. A protective cap 18 shields the actuator 9 from the direct flow of fluid.

The fluid then passes along an outer side of the frame 17, the second valve member 8 and the first valve member 7. The position of the second valve member 8, relative to the first valve member 7, has been set by means of the actuator 9, the spindle 13 and the nut 14, in such a manner that the uncovered portion of the orifices 10 formed in the first valve member 7 defines a desired opening degree of the valve 1.

The fluid then flows through the orifices 10 to an interior part of the first valve member 7. Finally, the fluid leaves the valve 1 via the outlet connector 6.

When the second valve member 8 is arranged in a position where an edge of the cup shaped second valve member 8 abuts the first sealing member 11, the valve 1 is in a closed position, where no fluid is allowed to pass through the orifices 10, and no fluid is thereby allowed to pass through the valve 1. The first sealing member 11 and the second sealing member 12, in this situation, ensure that fluid is not allowed to leak through the valve 1.

Figure 2:
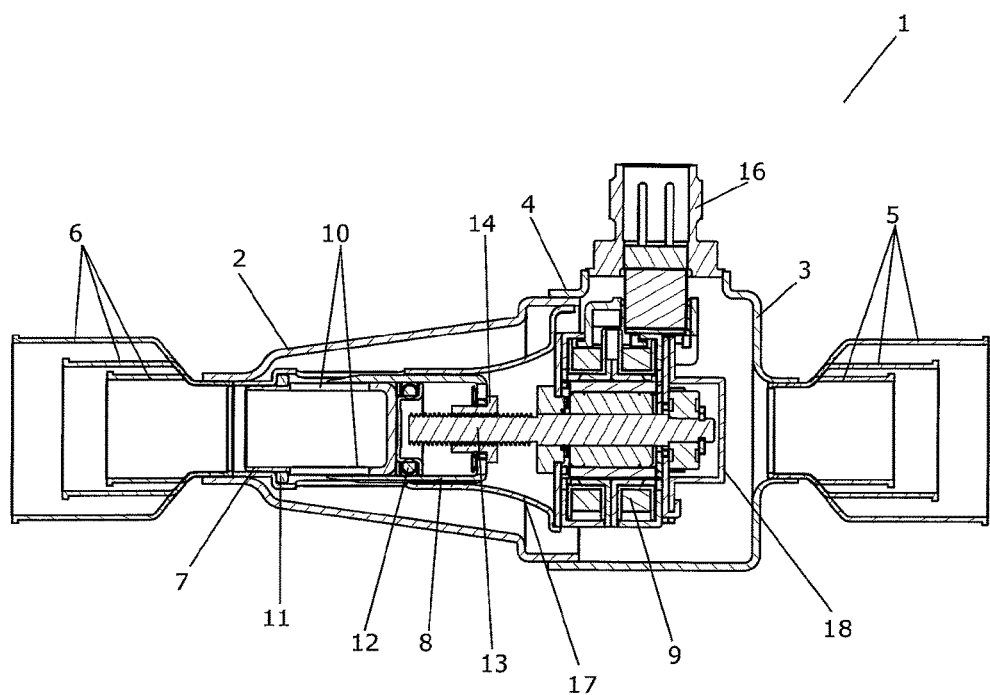
FIG. 2 is a cross sectional view of a valve according to a second embodiment of the invention.

FIG. 2 is a cross sectional view of a valve 1 according to a second embodiment of the invention. The valve 1 of FIG. 2 is very similar to the valve 1 of FIG. 1, and it will therefore not be described in detail here.

In the valve 1 of FIG. 2, the closed valve housing is smaller and slimmer than the valve housing of the valve 1 of FIG. 1. Thereby the valve 1 of FIG. 2 is more compact than the valve 1 of FIG. 1, and the valve 1 of FIG. 2 may therefore be used in applications where the available space is limited. Furthermore, the manufacturing costs are reduced.

In the valve 1 of FIG. 2 the sight glass has been omitted, in order to allow for the slimmer design of the closed valve housing, and in order to keep the manufacturing costs at a low level. The operation of the valve 1 of FIG. 2 is essentially as described above with reference to FIG. 1.

Figure 3:
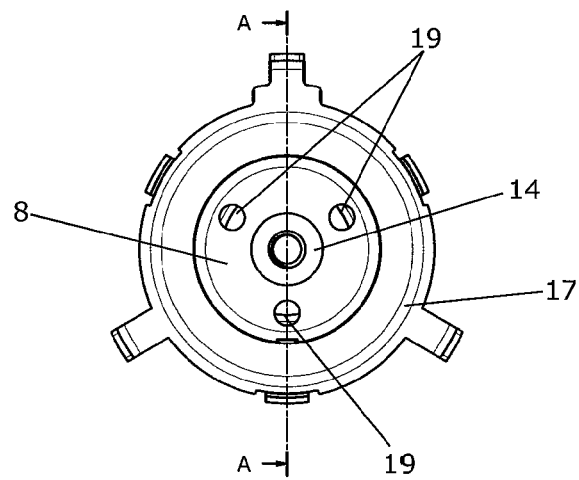
FIG. 3 is an end view of a first valve member and a second valve member for a valve according to an embodiment of the invention.

FIG. 3 is an end view of a first valve member (not visible) and a second valve member 8 for a valve according to an embodiment of the invention. The first valve member and the second valve member 8 of FIG. 3 may, e.g., form part of the valve 1 of FIG. 1 or the valve 1 of FIG. 2.

In FIG. 3 the second valve member 8 is mounted slidingly on a frame 17. Three openings 19 are formed in the closed end of the second valve member 8, thereby allowing fluid to pass through the closed end of the second valve member 8. This ensures that the same pressure level prevails on both sides of the closed end of the second valve member 8.

Figure 4:
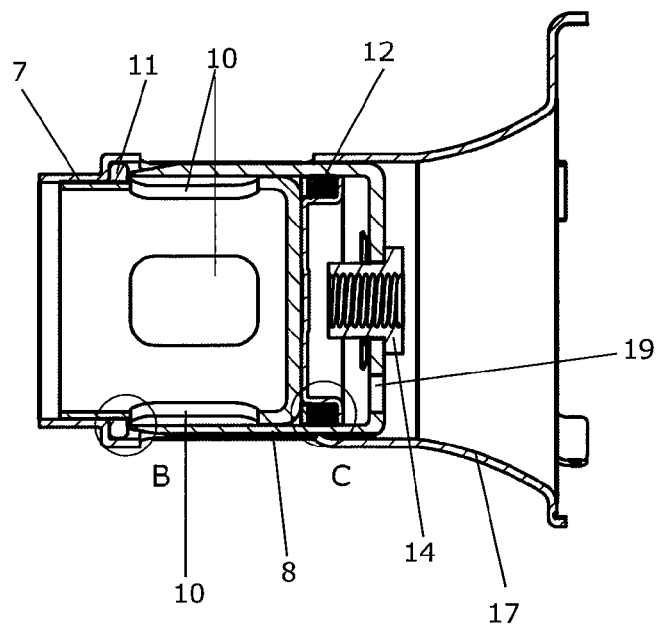
FIG. 4 is a cross sectional view of the first valve member and the second valve member of FIG. 3, along the line A-A.

FIG. 4 is a cross sectional view of the first valve member 7 and the second valve member 8 of FIG. 3, along the line A-A indicated in FIG. 3. It can be seen in FIG. 4 that the first valve member 7 is arranged inside the second valve member 8, and that the second valve member 8 is mounted slidingly on a frame 17. The second valve member 8 is capable of performing sliding movements relative to the first valve member 7, which is attached to the frame 17, and the frame 17 along a substantially axial direction. The movements of the second valve member 8 are caused by an actuator, via a spindle arranged in engagement with an inner thread of a threaded nut 14 attached to the second valve member 8.

The first valve member 7 is provided with a number of orifices 10 formed in a side wall of the first valve member 7. During operation, fluid flows through the orifices 10. The position of the second valve member 8 relative to the first valve member 7 determines the portions of the orifices 10 which are covered and uncovered, respectively, by the second valve member 8. Accordingly, the size of a fluid passage defined by the orifices 10 and the second valve member 8, and thereby an opening degree of the valve, is determined by the relative position of the first valve member 7 and the second valve member 8. In FIG. 4 the second valve member 8 is arranged in a position where the orifices 10 are completely covered by the second valve member 8. Accordingly, the valve is in a closed position, i.e. fluid is not allowed to pass through the orifices 10.

A first sealing member 11 and a second sealing member 12 are arranged between the first valve member 7 and the second valve member 8, in order to provide sealing between the first valve member 7 and the second valve member 8, thereby preventing internal leaks of the valve. In the closed position of the valve illustrated in FIG. 4 an edge of the second valve member 8 abuts the first sealing member 11, thereby efficiently preventing fluid from passing through the orifices 10 of the first valve member 7. The edge of the second valve member 8 is tapered in a direction towards the first valve member 7.

The first sealing member 11 defines a first diameter as the diameter of the contact point between the edge of the second valve member 8 and the first sealing member 11. Similarly, the second sealing member 12 defines a second diameter as the diameter of the contact point between a side wall of the second valve member 8 and the second sealing member 12. Since the edge of the second valve member 8 is tapered in a direction towards the first valve member 7, the inner diameter of the second valve member 8, i.e. the diameter of the second valve member 8 which faces the first valve member 7, is substantially the same along the length of the second valve member 8, between the first sealing member 11 and the second sealing member 12. Therefore the first diameter and the second diameter are substantially identical.

During operation of the valve, a high pressure is prevailing in the fluid flowing through the valve at the right hand side of the Figure, i.e. at the closed ends of the first valve member 7 and the second valve member 8. Furthermore, the high pressure is prevailing along the outer surface of the second valve member 8. However, inside the first valve member 7 a lower pressure is prevailing. Accordingly, a differential pressure exists across the orifices 10, or across the second valve member 8 in the closed position illustrated in FIG. 4.

Due to the tapered shape of the edge of the second valve member 8, a force due to the high pressure acts on the second valve member 8, at the tapered edge, in a direction from left to right in FIG. 4. However, because the first diameter defined by the first sealing member 11 is equal to the second diameter defined by the second sealing member 12, this force is substantially equal to a force acting on the second valve member 8, due to the high pressure, in an opposite direction, i.e. from right to left in FIG. 4. Thereby the forces acting on the second valve member 8, due to the high pressure, are automatically balanced. Thereby, when it is desired to open the valve by moving the second valve member 8 towards the right in FIG. 4, it is not necessary to overcome any additional forces originating from the pressure acting on the second valve member 8. Accordingly, the valve is naturally balanced, and less force is required for opening the valve.

Figure 5:
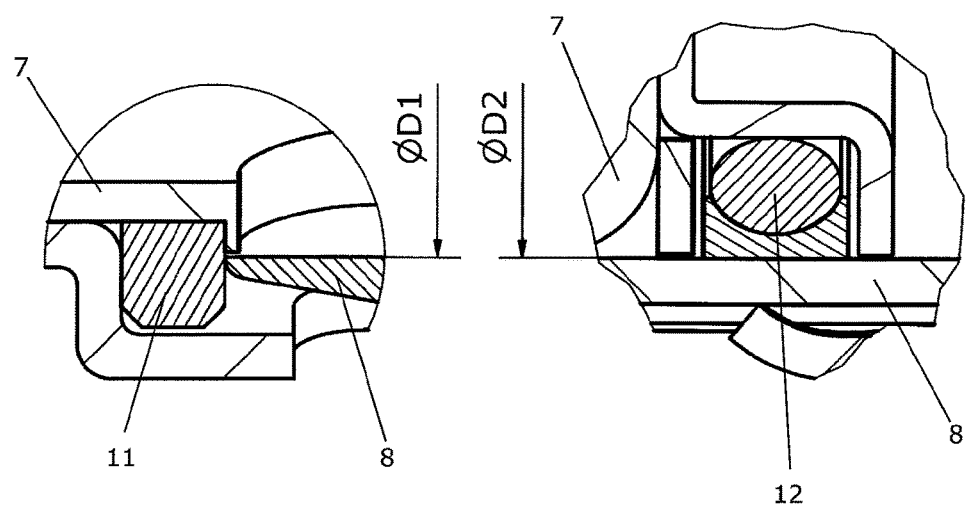
FIG. 5 shows two details of the first valve member and second valve member of FIGS. 3 and 4.

FIG. 5 shows two details of the first valve member 7 and the second valve member 8 of FIGS. 3 and 4, indicated by B and C in FIG. 4. Thus, FIG. 5 shows the first sealing member 11 and the second sealing member 12 in greater detail. It is clear from FIG. 5 that the diameter defined by the first sealing member 11 is equal to the diameter defined by the second sealing member 12, resulting in the balancing of forces described above with reference to FIG. 4.

Figure 6:
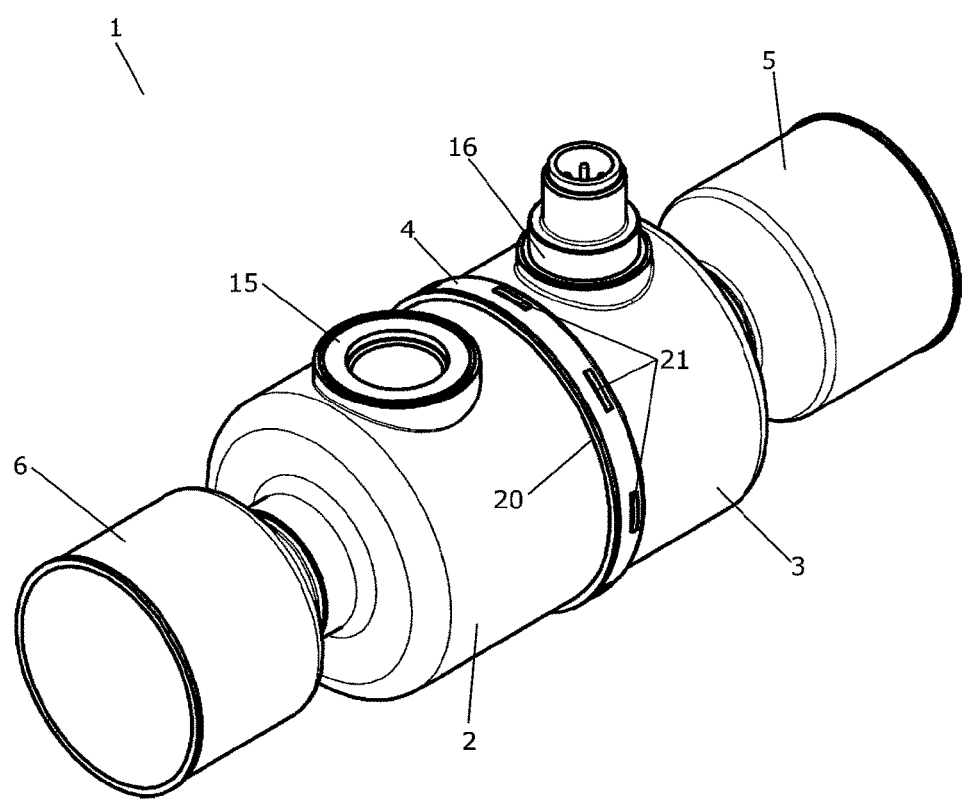
FIG. 6 is a perspective view of the valve of FIG. 1.

FIG. 6 is a perspective view of the valve 1 of FIG. 1, illustrating a welding joint at the connecting zone 4 between the first housing part 2 and the second housing part 3. The welding joint comprises a first welding seam 20 and a second welding seam 21.

The first welding seam 20 is arranged along an edge of the second housing part 3. The first housing part 2 is arranged inside the second housing part 3, and thereby the edge of the second housing part 3 is arranged at an outer surface of the valve housing. Thereby the first welding seam 20 seals a gap formed between the first housing part 2 and the second housing part 3 at the connecting zone 4, i.e. in the region where the first housing part 2 and the second housing part 3 overlap, with respect to the exterior of the valve housing. Accordingly, substances are prevented from entering the gap between the first housing part 2 and the second housing part 3 from outside the valve housing. Thereby gap corrosion caused by such substances is prevented by means of the first welding seam 20. The first welding seam 20 is a full welding seam in the sense that it extends along the edge of the second housing part 3, along the entire circumference defined by the valve housing.

The second welding seam 21 is arranged in the connecting zone 4, i.e. in the region where the first housing part 2 and the second housing part 3 overlap. The second welding seam 21 is a partial welding seam in the sense that it only extends along a part of the circumference defined by the valve housing. The second welding seam 21 shown in FIG. 6 extends along eight portions, three of which are visible, each covering 15°, the eight portions being arranged equidistantly along the circumference defined by the valve housing. The second welding seam 21 provides additional strength to the welding joint, while ensuring that the amount of heat transferred to the valve 1 during the welding process is not excessive.

Manufacturing tolerances of the second housing part 3 and inaccuracies in the welding process may have the consequence that the first welding seam 20 is not capable of providing sufficient strength to the welding joint. Therefore the second welding seam 21 is necessary in order to provide the required strength to the welding joint.

Figure 7:
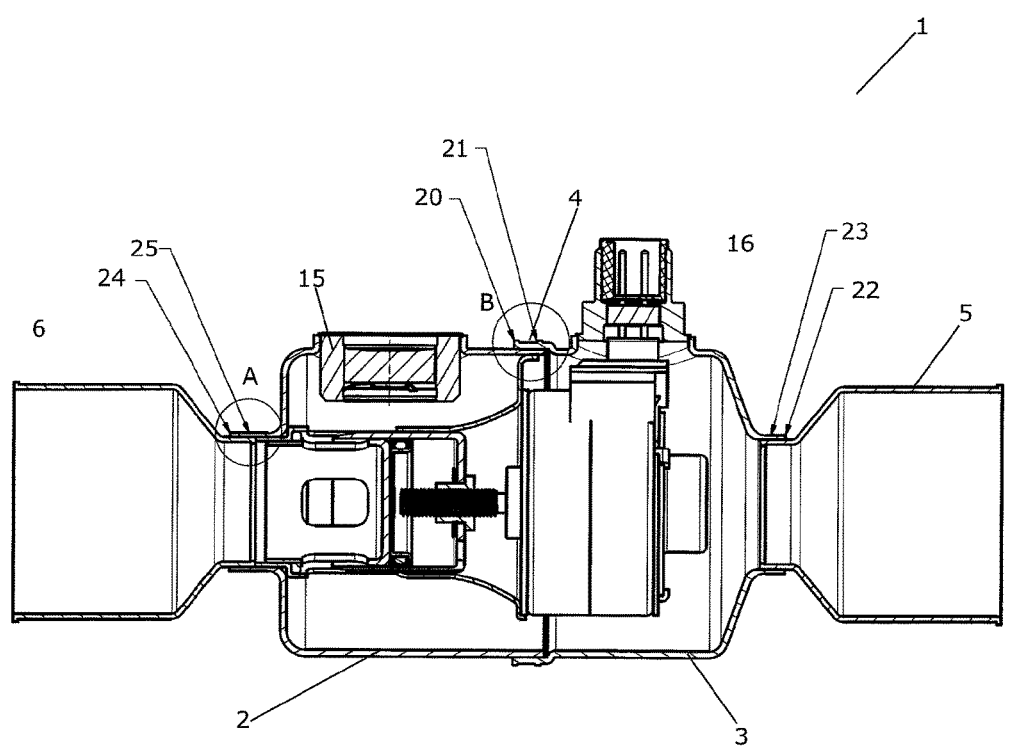
FIG. 7 is a cross sectional view of the valve of FIGS. 1 and 6, and FIGS. 8a and 8b show details of the valve of FIG. 7.

FIG. 7 is a cross sectional view of the valve 1 of FIGS. 1 and 6. In the valve 1 of FIG. 7 the inlet connector 5 is attached to the second housing part 3 by means of welding, and the outlet connector 6 is attached to the first housing part 2 by means of welding.

The inlet connector 5 and the second housing part 3 overlap in such a manner that the inlet connector 5 is arranged inside the second housing part 3 in the overlap region. The welding joint of the inlet connector 5 and the second housing part 3 comprises two welding seams 22, 23. One of the welding seams 22 is arranged at an edge of the second housing part 3. Thereby this welding seam 22 seals a gap formed between the inlet connector 5 and the second housing part 3, with respect to the exterior of the valve housing. Accordingly, the welding seam 22 prevents gap corrosion, in the manner described above with reference to FIG. 6.

The other welding seam 23 is arranged in the overlap region of the inlet connector 5 and the second housing part 3. Thereby this welding seam 23 provides strength to the welding joint, in the manner described above with reference to FIG. 6.

Similarly, the outlet connector 6 and the first housing part 2 overlap in such a manner that the outlet connector 6 is arranged inside the first housing part 2 in the overlap region. The welding joint of the outlet connector 6 and the first housing part 2 comprises two welding seams 24, 25. One of the welding seams 24 is arranged at an edge of the first housing part 2. Thereby this welding seam 24 seals a gap formed between the outlet connector 6 and the first housing part 2, with respect to the exterior of the valve housing. Accordingly, the welding seam 24 prevents gap corrosion, in the manner described above with reference to FIG. 6.

The other welding seam 25 is arranged in the overlap region of the outlet connector 6 and the first housing part 2. Thereby this welding seam 25 provides strength to the welding joint, in the manner described above with reference to FIG. 6.

Figure 8A:
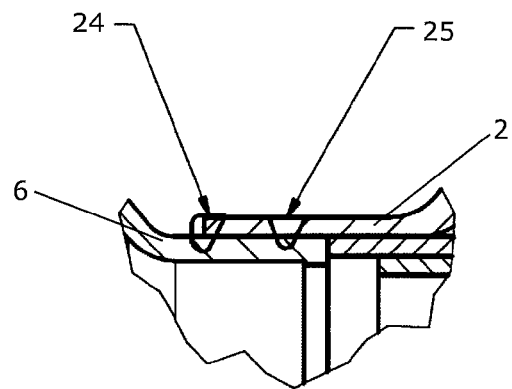
Figure 8B:
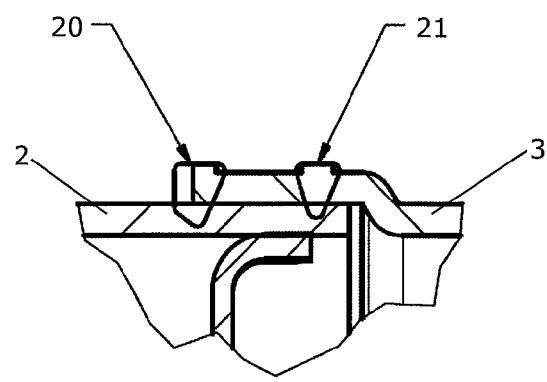

FIGS. 8a and 8b show details of the valve of FIG. 7, corresponding to the regions marked 'A' and 'B', respectively, in FIG. 7. Thus, FIG. 8a shows the welding joint of the outlet connector 6 and the first housing part 2, and FIG. 8b shows the welding joint of the first housing part 2 and the second housing part 3. The positions of the welding seams 20, 21, 24, 25 are shown in greater detail.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:
1. A valve comprising:
a first housing part and a second housing part, the first housing part and the second housing part forming a closed housing of the valve,
an inlet connector arranged to receive fluid from a fluid flow line to an interior part of the closed housing, and an outlet connector arranged to deliver fluid to the fluid flow line from the interior part of the closed housing, a fluid flow path through the valve thereby being defined, the fluid flow path providing a fluid connection from the inlet connector to the outlet connector, a first valve member and a second valve member arranged inside the housing, the first valve member and the second valve member being movable relative to each other, and the first valve member and the second valve member defining a fluid passage arranged in the fluid flow path, a size of the fluid passage being determined by a relative position of the first valve member and the second valve member, an actuator arranged inside the housing for driving movements of the first valve member and/or the second valve member, said actuator being arranged directly in a flow of fluid flowing in the fluid flow path during operation of the valve, wherein the first housing part and the second housing part are made from a sheet metal material, and wherein the first housing part and the second housing part have been joined to form the closed housing by means of welding, wherein the first valve member, the second valve member and the actuator are assembled to form a valve cartridge, and wherein the valve cartridge is attached to the first housing part or the second housing part by means of welding.

2. The valve according to claim 1, wherein the first housing part and the second housing part have been joined to form the closed housing by means of laser welding.

3. The valve according to claim 2, wherein the first housing part and the second housing part are arranged with an overlap, and wherein the valve comprises a first welding seam arranged at an edge of the first housing part or the second housing part, and a second welding seam arranged in a region defined by the overlap of the first housing part and the second housing part.

4. The valve according to claim 2, wherein the first housing part and/or the second housing part is/are made from deep drawn sheet metal material.

5. The valve according to claim 1, wherein the first housing part and the second housing part are arranged with an overlap, and wherein the valve comprises a first welding seam arranged at an edge of the first housing part or the second housing part, and a second welding seam arranged in a region defined by the overlap of the first housing part and the second housing part.

6. The valve according to claim 5, wherein the first welding seam is a full welding seam, extending entirely along a circumference defined by the closed housing, and wherein the second welding seam is a partial welding seam, extending only partly along the circumference defined by the closed housing.

7. The valve according to claim 6, wherein the first housing part and/or the second housing part is/are made from deep drawn sheet metal material.

8. The valve according to claim 5, wherein the first housing part and/or the second housing part is/are made from deep drawn sheet metal material.

9. The valve according to claim 1, wherein the first housing part and/or the second housing part is/are made from deep drawn sheet metal material.

10. The valve according to claim 1, wherein the inlet connector and/or the outlet connector is/are attached to the first housing part or the second housing part by means of welding.

11. The valve according to claim 10, wherein the inlet connector and/or the outlet connector is/are arranged with an overlap with respect to the first housing part or the second housing part, and wherein at least one welding of a connector and a housing part comprises at least two welding seams.

12. The valve according to claim 1, wherein the first valve member comprises one or more orifices and the second valve member comprises one or more closing elements being arranged to cover a part of the one or more orifices, and wherein the relative position of the first valve member and the second valve member determines a portion of the one or more orifices being covered by the one or more closing elements of the second valve member.

13. The valve according to claim 1, further comprising a first sealing member arranged to provide sealing between the first valve member and the second valve member at an outlet side of the fluid passage, and a second sealing member arranged to provide sealing between the first valve member and the second valve member at an inlet side of the fluid passage.

14. The valve according to claim 13, wherein the first sealing member is arranged to provide sealing between the first valve member and the second valve member only when the valve is in a closed position.

15. The valve according to claim 1, wherein the second valve member is linearly movable with respect to the first valve member, and wherein the second valve member is formed with surfaces in a high pressure region in the valve so that forces acting on the surfaces of the second valve member, due to a pressure prevailing at the high pressure region in the valve, along a first direction of movement and along a second, opposite, direction of movement of the second valve member are substantially equal.

16. The valve according to claim 1, further comprising an encapsulation of at least a part of the actuator, said encapsulation providing shielding of at least a part of the actuator against a direct fluid flow of fluid flowing through the fluid flow path during operation of the valve.

17. The valve according to claim 1, wherein the valve comprises at least one element which is unable to withstand temperatures above 120° C.

18. The valve according to claim 17, wherein at least one of the elements is arranged in the interior part of the closed housing.

19. A valve comprising:
a first housing part and a second housing part, the first housing part and the second housing part forming a closed housing of the valve,
an inlet connector arranged to receive fluid from a fluid flow line to an interior part of the closed housing, and an outlet connector arranged to deliver fluid to the fluid flow line from the interior part of the closed housing, a fluid flow path through the valve thereby being defined, the fluid flow path providing a fluid connection from the inlet connector to the outlet connector,
a first valve member and a second valve member arranged inside the housing, the first valve member and the second valve member being movable relative to each other, and the first valve member and the second valve member defining a fluid passage arranged in the fluid flow path, a size of the fluid passage being determined by a relative position of the first valve member and the second valve member,
an actuator arranged inside the housing for driving movements of the first valve member and/or the second valve member, said actuator being arranged directly in a flow of fluid flowing in the fluid flow path during operation of the valve, wherein the first housing part and the second housing part are made from a sheet metal material, and wherein the first housing part and the second housing part have been joined to form the closed housing by means of welding, wherein the valve further comprises a first sealing member arranged to provide sealing between the first valve member and the second valve member at an outlet side of the fluid passage, and a second sealing member arranged to provide sealing between the first valve member and the second valve member at an inlet side of the fluid passage.

20. A valve comprising:
a first housing part and a second housing part, the first housing part and the second housing part forming a closed housing of the valve,
an inlet connector arranged to receive fluid from a fluid flow line to an interior part of the closed housing, and an outlet connector arranged to deliver fluid to the fluid flow line from the interior part of the closed housing, a fluid flow path through the valve thereby being defined, the fluid flow path providing a fluid connection from the inlet connector to the outlet connector,
a first valve member and a second valve member arranged inside the housing, the first valve member and the second valve member being movable relative to each other, and the first valve member and the second valve member defining a fluid passage arranged in the fluid flow path, a size of the fluid passage being determined by a relative position of the first valve member and the second valve member,
an actuator arranged inside the housing for driving movements of the first valve member and/or the second valve member, said actuator being arranged directly in a flow of fluid flowing in the fluid flow path during operation of the valve, wherein the first housing part and the second housing part are made from a sheet metal material, and wherein the first housing part and the second housing part have been joined to form the closed housing by means of welding, wherein the second valve member is linearly movable with respect to the first valve member, and wherein the second valve member is formed with surfaces in a high pressure region in the valve so that forces acting on the surfaces of the second valve member, due to a pressure prevailing at the high pressure region in the valve, along a first direction of movement and along a second, opposite, direction of movement of the second valve member are substantially equal.

* * * * *